7565X
G. M. Kendall,
Cracker Machine,
Patented May 3, 1833.
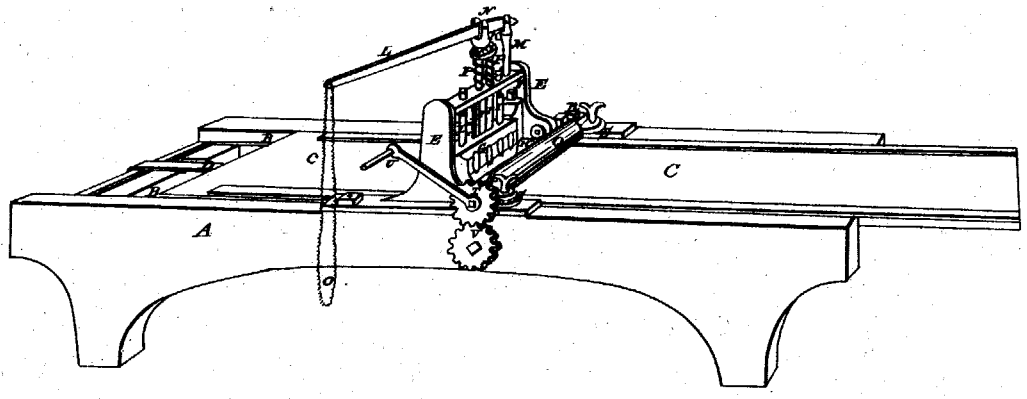
N. PETERS, PHOTO-LITHOGRAPHER, WASHINGTON, D. C.

7565X

May 3, 1833 353

George M. Kendall Hatshill N.Y.
Letters Patent

The Schedule referred to in these Letters Patent and making part of the same containing a description in the words of the said George M. Kendall himself of his improvement in the machine for cutting crackers.

Be it known that I George M. Kendall of the town of Hatshill in the County of Greene and State of New York have made an improvement in the machine for cutting crackers which is described as follows.

This machine is composed of a frame for supporting the machinery a sliding board on which the cakes are cut rollers and band to move the sliding board a cast iron frame, a head piece containing the cutters lever stirrups and spiral springs for operating the cutters rolls for preparing the dough. crank handle cog wheel &c for propelling the machine. The frame marked A in the annexed drawing is constructed by framing together two side pieces two end pieces and four posts of such size and strength as to support the other parts of the machine. The grooves B are made in the top of the side pieces of the frame to receive the sliding board.

The sliding board C is as wide as the inside of the frame between the grooves and of the length of the frame. Two rollers are placed across the frame between the two side pieces & under the sliding board. A band D fastened to the under side of the sliding board is passed around these rollers by which the board is moved backwards & forwards. A cast iron frame E composed of two upright standards and a top plate is erected over the centre of the frame & to which it is fastened by screw bolts. On the inside of each standard is a rib F to guide the head piece.

The head piece G containing the cutters is cast with a groove in each end to slide on the ribs before mentioned on the under side of this head piece are turned as many holes as there are cutters to be used and into which the cutters H are nicely fitted. In the centre of each cutter and through the head piece is drilled a hole to receive a rod I

75654 to the lower end of which rod is attached the follower working in the cutter the
upper end is fastened to the top plate of the frame. The [illegible] [illegible] are
inserted into the cutters in the usual manner. A movable frame J composed
of two posts & a cap is fastened on the top of the head piece.

The posts or side pieces of this frame are round bars of iron working
freely thro openings in the top plate of the cast iron frame. In the centre of
the cap piece of the movable frame is a small standard K. The lever L is
made of iron of suitable length & strength to operate the cutters and extends
across the frame having one end attached to an upright post M by a pin
a which it turns and is connected with the movable frame by an other
pin N passing thro the top of the small standard & lever. The other end of the
lever extends over the side of the machine having a stirrup strap O attached
to it by which it is operated. Spiral springs P are put around the posts
of the movable frame, one end of each spring resting on the plate of the
cast iron frame & the other end bearing against the under side of the cap
piece of the movable frame.

The roller Q for rolling the dough to a proper
thickness is placed across the top of the frame near the cutters its gudgeons
turning in movable boxes R graduated by screws and spiral springs S
to any thickness of cakes required. One of the gudgeons projects sufficiently
far to receive a cog wheel T and crank handle U. This cog wheel works
into another cog wheel V on the end of the gudgeon of one of the rollers carry
-ing the band and sliding board. The operation of the machine is as
follows.

The dough is prepared on the brake; it is then laid upon the sliding
board, the crank handle turned which brings forward the sliding board
with the dough under the roller where it is rolled to a proper thickness it is now
carried forward under the cutters the operators foot is put into the stirrup
at the end of the lever and pressed down which brings down the end of the
lever and with it the movable frame & cutters; the cakes are now cut and
[illegible] the foot is then raised and the movable frame returns to its former
position by the action of the spiral springs: at the same time the cakes are
discharged from the cutters by the followers on the ends of the rods.

7563X

In this manner the operation is continued. The cake and surplus dough are removed in the ordinary mode. A pinion on one of the rollers working into a rack on the under side of the moveable board, may be substituted for the roller and band to move the board.

What I claim as my invention in the before described machine is the application of the spiral spring lever and stirrup operated in the manner above described in cutting crackers.

In testimony whereof I hereunto subscribe my name this 27 day of April 1838.

Witnesses
William P. Elliot
William G. [illegible] (Dr in port folio)

George W. Kendall

Engd [illegible]

[illegible]